United States Patent

Kadowaki

[15] 3,677,624
[45] July 18, 1972

[54] MOVIE PROJECTOR FOR USE WITH A FILM CARTRIDGE OR REEL

[72] Inventor: Tatsusuke Kadowaki, Yokohama, Japan
[73] Assignee: Kabushiki Kaisha Ricoh, Tokyo, Japan
[22] Filed: Sept. 14, 1970
[21] Appl. No.: 71,860

[30] Foreign Application Priority Data
Sept. 17, 1969 Japan..................................44/74231

[52] U.S. Cl..............................352/73, 242/181, 242/197, 352/136
[51] Int. Cl......................................................G03b 23/02
[58] Field of Search..............352/73, 79, 124, 136; 242/181, 242/197

[56] References Cited

UNITED STATES PATENTS

| | | | |
|---|---|---|---|
| 3,275,253 | 9/1966 | Cherniavskyj | 242/197 X |
| 3,337,147 | 8/1967 | Soong et al. | 242/197 |
| 3,552,683 | 1/1971 | Bundschuh et al. | 352/73 X |
| 3,583,655 | 6/1971 | Roman | 242/197 |

*Primary Examiner*—Samuel S. Matthews
*Assistant Examiner*—Fred L. Braun
*Attorney*—McGlew and Toren

[57] ABSTRACT

An 8mm movie projector is operable selectively with either a film cartridge or an open reel, and includes a reel support arm provided in the upper part of the projector housing for vertical displacement into and out of the projector. The reel support arm has a spindle projecting laterally therefrom adjacent its upper edge, for fitting of a film reel over the spindle. When the reel support arm is in an upper position in which it projects from the projector, an open reel can be used with the projector. When the reel support arm is retracted to a lower position within the projector, a film cartridge can be used with the projector. A drive mechanism is engaged with the spindle and is selectively operable to rotate the spindle in the rewind direction, and a drive member is included in the drive mechanism and is engaged with a driven member of the film driving member in each of the two positions of the reel support arm. The drive mechanism includes a normally disengaged selectively operable clutch.

7 Claims, 5 Drawing Figures

Patented July 18, 1972

3,677,624

INVENTOR.
TATSUSUKE KADOWAKI
BY McGlew and Toren
ATTORNEYS

MOVIE PROJECTOR FOR USE WITH A FILM CARTRIDGE OR REEL

BACKGROUND OF THE INVENTION

In recent years, film cartridges have been used widely to facilitate loading of a projector with film, and to facilitate operation of the projector. For examples, cartridges for super 8mm film of the Eastman Kodak Company are available in three film lengths of 50, 100 and 400 feet, respectively. The cartridge containing 400 feet of film is of a relatively large size, and the projector to which such a cartridge is attached naturally must have a cartridge supporting portion of relatively large dimensions. In turn, this leads to an increase in the overall size of the projector.

Additionally, projectors intended for use with film cartridges have not been usable with open reels. Thus, the center position of the reel of the cartridge, which center position corresponds to the film feed spindle, may vary in dependence on the size of the cartridge and its relation to the film feed device. Consequently, it usually is impossible to mount an open reel of large size in the cartridge mounting portion of the projectors.

SUMMARY OF THE INVENTION

This invention relates to 8mm movie projectors and, more particularly, to an 8mm movie projector operable selectively with either a film cartridge or an open reel.

The present invention is directed to reducing the size of projectors by limiting the size to such a degree that film cartridges containing either 50 feet or 100 feet of film can be mounted on the projectors, but an open reel must be used for projecting film of 400 feet. The 8mm movie projector of the invention makes it possible to use either an open reel or a cartridge selectively, by merely moving a reel support arm into and out of the projector and without providing an open reel mounting spindle in addition to the regular cartridge mounting spindle.

To this end, an 8mm movie projector embodying the invention includes, in addition to the usual components of a projector such as the projection system and the film guiding and driving means, a reel support arm having a film spindle projecting laterally therefrom. The arm is mounted in the housing for movement between a retracted position, in which it supports a film cartridge, and an extended position, in which it supports an open reel. Drive mechanism is engaged with the spindle and is selectively operable to rotate the spindle in the rewind direction. A driving member included in the drive mechanism is engaged with a driven member of the film driving means in each of the two positions of the reel support arm.

In a preferred embodiment of the invention, the support arm is slidably mounted adjacent the upper surface of the projector for movement between a retracted position, in which it is disposed within the projector, and an extended position in which it projects upwardly from the projector. Detent means are provided to releasably retain the support arm in either of its two positions, and limiting means are provided to prevent complete withdrawal of the support arm from the projector. The drive mechanism includes a normally disengaged selectively engageable clutch, which is engaged when it is desired to rewind the film in either position of the support arm.

An object of the invention is to provide an improved 8mm movie projector.

Another object of the invention is to provide such an 8mm movie projector which is operable with either a film cartridge or an open reel.

A further object of the invention is to provide such a projector which has only a single spindle usable with either a film cartridge or an open reel.

Another object of the invention is to provide such a projector including a support arm carrying the single spindle, and which is movable between a retracted position, in which a film cartridge can be mounted on the spindle, and a projected position, in which an open reel can be mounted on the same spindle.

A further object of the invention is to provide such a projector including drive mechanism engaged with the spindle and selectively operable to rotate the latter in the rewind direction.

Another object of the invention is to provide such a projector having a drive member included in the drive mechanism and engaged with a driven member of the film driving means of the projector in each of the two positions of the reel support arm.

A further object of the invention is to provide such a projector including a normally disengaged, selectively engageable clutch incorporated in the drive mechanism.

For an understanding of the principles of the invention, reference is made to the following description of a typical embodiment thereof as illustrated in the accompanying drawings.

DESCRIPTION OF THE PREFERRED EMBODIMENT

Figure 1:
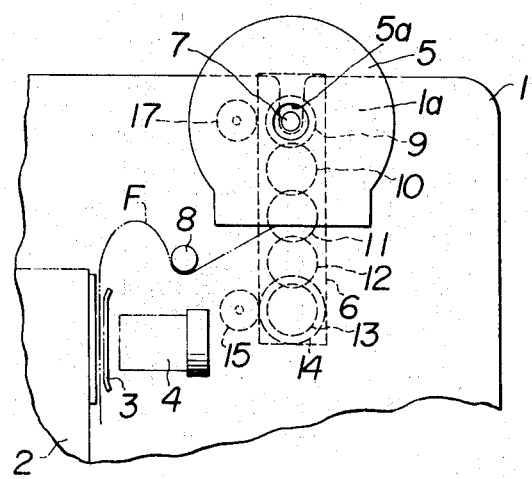
FIG. 1 is a fragmentary side elevation view of an 8mm movie projector, in accordance with one embodiment of the invention, showing the parts in a position mounting a film cartridge.

Referring to FIG. 1, an 8mm movie projector 1 is illustrated as comprising a light source 2, a film retaining and guiding plate 3, and a projection lens cylinder 4. A film cartridge 5 is mounted in a cartridge supporting portion 1a of projector 1. Cartridge 5 is formed with a center opening 5a which fits over a film feed spindle 7 connected to a reel support arm 6 which, in the position shown in FIG. 1, is retracted to a lower position within projector 1. A film F, paid out from cartridge 5, is trained into contact with a film guide wheel 8 and then trained between light source 4 and plate 3, and the film is finally wound on a take-up reel (not shown).

Within reel support arm 6, there is a drive mechanism for reversing the direction of rotation of film spindle 7, during rewinding. This drive mechanism comprises a gear 9 mounted on spindle 7, intermediate gears 10, 11, 12 and 13, and a gear 14 connected to gear 13 through clutch means described hereinafter. Gears 9, 10, 11, 12 and 13 are maintained in meshing engagement with each other and, in FIG. 1, gear 14 is illustrated as meshing with a drive gear 15, which is a member driven from the film driving means of projector 1. Gears 9 through 13 are rotated only when the film is moved in the rewind direction, to rotate film feed spindle 7 in a direction opposite to the direction of its normal rotation during forward feeding of the film.

Figure 2:
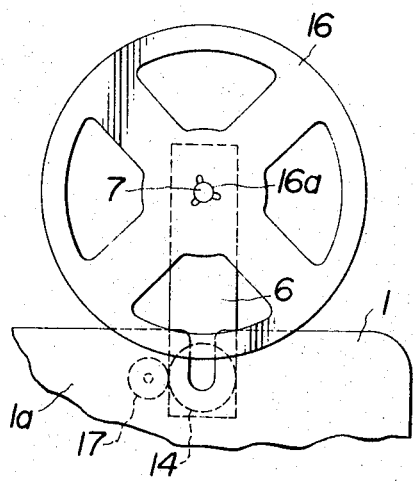
FIG. 2 is a view similar to FIG. 1 but showing the parts in the position mounting an open reel.
Figure 3:
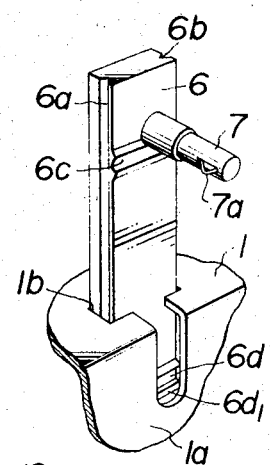
FIG. 3 is a perspective view of the reel support arm of the projector shown in FIGS. 1 and 2.

As shown in FIG. 2, an open reel 16 is mounted on projector 1 by engaging its reel opening 16a over film feed spindle 7 of reel support arm 6 when the latter is in an extended or upper position in which it projects out of projector 1. Feed spindle 7 is provided with a latching member 7a, as best seen in FIG. 3, for latching reel opening 16a in position. A drive gear 17, forming a member driven by the film driving means of projector 1, is arranged to mesh with gear 14 of reel support arm 6 when support arm 6 is in its upper or projected position. Open reel 16 is caused to rotate in a rewind direction, opposite to the film feed direction, by gear 17 acting through the drive mechanism engaged with spindle 7.

Figure 4:
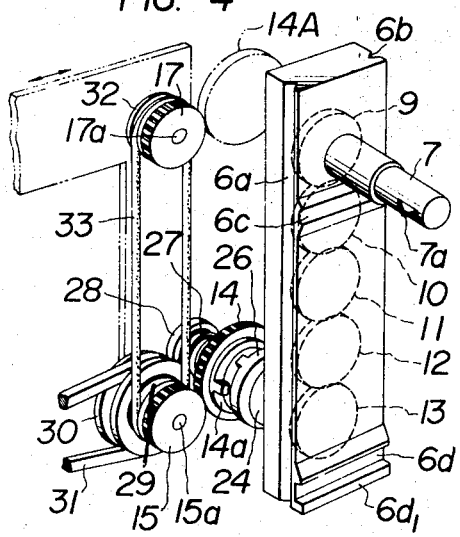
FIG. 4 is a perspective view of the drive mechanism for reversing the rotation of the film feed spindle to rewind the film.
Figure 5:
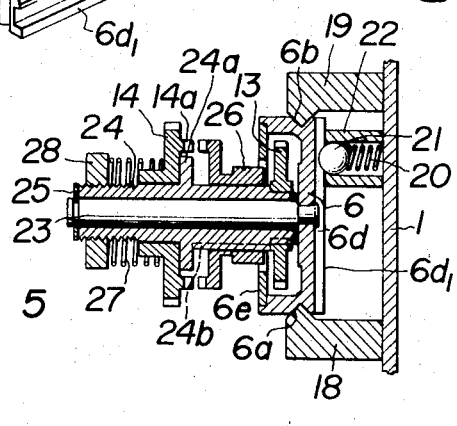
FIG. 5 is a horizontal sectional view of the reel support arm illustrating the structure of the lower portion thereof.

As best seen in FIGS. 3, 4 and 5, reel support arm 6 is formed with V-shaped grooves 6a and 6b extending longitudinally of the opposite vertically oriented edges of arm 6. Support arm 6 extends loosely through an opening 1b formed in the upper part of the film cartridge mounting portion 1a of projector 1, and guide members or rails 18 and 19, secured on the inner wall of projector 1 as best seen in FIG. 5, engage in grooves 6a and 6b, respectively, to support reel support arm 6 for vertical sliding motion.

Reel support arm 6 is formed with click stops 6c and 6d, as best seen in FIG. 4, in the upper and lower portions, respectively, of that surface of support arm 6 adjacent the cartridge mounting portion 1a. A detent ball 21 is biased by a spring 20 to move forwardly, as best seen in FIG. 5, to engage click stop 6c, when reel support arm 6 is retracted into projector 1, and to engage click stop 6d when reel support arm 6 is projected out of projector 1. Thus, arm 6 can be latched either in its lower, or cartridge mounting position, or its upper, or open reel mounting position. Click stop 6d has a lower projecting edge $6d_1$ as best seen in FIG. 4, which is arranged to engage a locking or abutment member (not shown) formed in the inner wall of projector 1 when support arm 6 is moved upwardly, so as to prevent arm 6 from being withdrawn entirely out of opening 1b. Ball 21 is housed in a support cylinder 22 having an inturned forward end, as best seen in FIG. 5, so as to restrict outward movement of ball 21 and prevent the ball from scratching the inner surface of support arm 6 when the latter is moved upwardly or downwardly.

Referring to FIG. 5, a shaft 23 is connected to the inner side of the lower portion of reel support arm 6 and extends through a side plate 6e into projector 1. A sleeve 24, having a flange 24a, is rotatably telescoped over shaft 23 and prevented by an E-ring 25 from being dislodged axially from shaft 23. A key 24b is provided on that portion of sleeve 24 extending toward its base, or to the right in FIG. 5, from flange 24a. A clutch 26 is slidably mounted on this portion of sleeve 24, and has a keyway engaging key 24b so as to rotate with sleeve 24 as a unit.

Gear 13 is mounted on that portion of sleeve 24 disposed within support arm 6, and gear 14 is loosely mounted adjacent flange 24a on that portion of sleeve 24 which extends toward its forward end from flange 24a. A stop-ring 28 is threadedly engaged on the forward end of sleeve 24, and a spring 27 is mounted between stop ring 28 and gear 14 so as to bias gear 14 toward flange 24a. The adjacent surfaces of gear 14 and flange 24a are thus maintained in frictional engagement with each other. The peripheral portion of that surface of gear 14 adjacent clutch 26 is formed as a clutch portion 14a which is adapted to engage clutch 26.

When reel support arm 6 is disposed in its lower or cartridge mounting position, as shown in FIG. 1, gear 14 is brought into meshing engagement with drive gear 15 provided in projector 1, as shown in FIG. 4. Pulleys 29 and 30 are mounted on a shaft 15a of gear 15 coaxially and unitarily with gear 15 for rotation as a unit with the latter. A belt 31 is trained about pulley 30 and about a driving member of the projector film drive means.

When reel support arm 6 is in its upper or open reel mounting position, as shown in FIG. 2, gear 14 is moved to the broken line position 14a shown in FIG. 4, and brought into meshing engagement with drive gear 17 provided in projector 1. A pulley 32 is mounted on shaft 17a of gear 17, coaxially and integrally with gear 17 for rotation as a unit therewith, and an endless belt 33 is trained about pulleys 32 and 29. When the film is moved in the normal or forward direction for projection, drive gear 15 is maintained out of engagement with gear 14 so as not to rotate gear 14. More specifically, drive gears 15 and 17 are mounted on support means movable relative to the projector, as indicated by the double arrow in FIG. 4, so that gear 14 is brought into meshing engagement with either drive gear 15 or drive gear 17 only when the film is to be moved in the reverse or rewind direction.

Clutch 26 is normally disengaged, and can be engaged manually or otherwise, by sliding on sleeve 24, with clutch portion 14a of gear 14 when it is desired to move the film in the reverse direction from the take-up reel to the supply reel, so that reverse rotation can be transmitted from the drive source to film spindle 17.

It should be noted that, in the projector of the invention, it is possible to rotate the film feed spindle in the reverse direction irrespective of whether reel support arm 6 is disposed in its cartridge supporting position or in its open reel attaching position. Furthermore, suitable means, other than those illustrated in the preferred embodiment described above, such as connection means relying on frictional engagement and using friction wheels, for example, may be used.

From the foregoing description, it will be appreciated that the invention permits ready and positive attachment of either a film cartridge or an open reel to the projector, and necessitates only a single spindle 7. The cartridge mounting portion of the projector does not in any way interfere with the film feed movement of the open reel when mounted on the projector. The construction and operation are thus simple, in addition to which it is possible to simplify the projector and to obtain a compact overall size therefor.

While, in the illustrated embodiment, reel support arm 6 has been described as movable slidably relative to projector 1, it will be understood that the base of the reel support arm may be pivotally supported by a shaft connected to the projector, so that the film feed spindle, connected to the free end of the support arm, may be disposed selectively in either the cartridge mounting position or the open reel mounting position.

While a specific embodiment of the invention has been shown and described in detail to illustrate the application of the principles of the invention, it will be understood that the invention may be embodied otherwise without departing from such principles.

What is claimed is:

1. In an 8mm movie projector including a housing, a projection system including a light source and projection lens means, and a film guiding and driving means for moving the film through the projection system, an improvement whereby the projector is operable selectively with either a film cartridge or an open reel, said improvement comprising, in combination, an elongated rectilinear vertically oriented reel support arm; a film feed spindle projecting from the upper end of said support arm; rectilinear guide means mounting said support arm in said housing for rectilinear vertical movement between a retracted film cartridge-supporting lower position, in which a film cartridge is operatively engaged with said spindle, and an extended open reel-supporting upper position, in which an open reel is engaged on said spindle; a drive mechanism in said arm engaged with said spindle and selectively operable to rotate said spindle in the rewind direction; said film driving means including first and second vertically spaced and aligned driven members conjointly rotatable in the same direction; and a drive member on said arm operable to drive said spindle through said drive mechanism; said drive member engaging a respective one of said first and second driven members only when said arm is in a corresponding one of its upper or lower positions, and being disengaged from both said driven members when said arm is in any position intermediate its upper and lower positions.

2. In an 8mm movie projector, the improvement claimed in claim 1, including a clutch incorporated in said drive mechanism between said drive member and said spindle.

3. In an 8mm movie projector, the improvement claimed in claim 1, including detent means releasably retaining said reel support arm in each of its upper and lower positions.

4. In an 8 mm movie projector, the improvement claimed in claim 1, including stop means limiting outward movement of said reel support arm.

5. In an 8mm movie projector, the improvement claimed in claim 1, in which said drive mechanism comprises a train of intermeshed gears rotatably mounted in said reel support arm, one of said gears being fixed to rotate with said film feed spindle.

6. In an 8mm movie projector, the improvement claimed in claim 1, in which said reel support arm has a hollow rectangular cross-section including inner and outer walls interconnected by side walls; each of said side walls having a groove extending longitudinally thereof; said rectilinear guide means comprising a pair of rails in said housing each engaged in a respective one of said grooves.

7. In an 8mm movie projector, the improvement claimed in claim 1, including a shaft projecting from said reel support arm adjacent its lower end; said drive member comprising a gear rotatably mounted on said shaft; said shaft being drivingly connected to said drive mechanism; and a clutch slidable on said shaft and selectively operable to connect said drive member to said shaft to operate said drive mechanism.

* * * * *